US006726192B2

(12) United States Patent
Devers

(10) Patent No.: US 6,726,192 B2
(45) Date of Patent: Apr. 27, 2004

(54) WOOD PANEL CLAMPING TOOL

(76) Inventor: Lawrence N. Devers, 401 W. Craig Rd., Pittsburg, KS (US) 66762

(*) Notice: Subject to any disclaimer, the term of this patent is extended or adjusted under 35 U.S.C. 154(b) by 225 days.

(21) Appl. No.: 10/017,366

(22) Filed: Dec. 13, 2001

(65) Prior Publication Data

US 2003/0111172 A1 Jun. 19, 2003

(51) Int. Cl.[7] .................................................. B23Q 3/08
(52) U.S. Cl. .......................... 269/25; 144/352; 144/344
(58) Field of Search ................................ 144/352, 344, 144/356, 241 B, 245 B; 156/350; 269/25, 134, 147–149, 155, 221, 228, 287, 113, 256, 156, 219, 111, 118, 119

(56) References Cited

U.S. PATENT DOCUMENTS 1,827,258 A 10/1931 Payzant
3,771,779 A 11/1973 Mortoly
4,427,191 A 1/1984 Hess
4,778,555 A 10/1988 Mortoly et al.
4,952,269 A * 8/1990 Mortoly et al. ............. 156/350
5,006,193 A * 4/1991 Quick ........................ 156/350
5,058,870 A 10/1991 Cetnar
5,240,051 A * 8/1993 Quick et al. ................ 144/352
5,467,972 A 11/1995 Lee et al.

* cited by examiner

*Primary Examiner*—Joseph J. Hail, III
*Assistant Examiner*—Daniel Shanley
(74) *Attorney, Agent, or Firm*—Hovey Williams LLP

(57) ABSTRACT

A power-operated hand tool has a handle portion or frame that is gripped by the operator using two hands. A clamping portion comprising a pair of opposed jaws extends outwardly from the handle portion and utilizes an air cylinder to move an upper clamping jaw toward and away from the lower fixed jaw. Both jaws have free outermost ends that cooperatively define an entry mouth into a clamping zone between the jaws. In use, a group of individual boards are laid side-by-side in edge-to-edge relationship slightly above a work surface so as to permit the lower jaw of the tool to be slipped beneath the boards while the upper jaw becomes placed above the boards, both of which extend transversely across the boards. Upon actuation of the air cylinder, the upper jaw comes down into flattening engagement with the boards, causing them to be clamped down into generally flat alignment with one another in a common plane so as to present a substantially smooth top surface. Thereupon, the panel may be squeezed tightly from the side by bar clamps or the like to shift the flattened boards into tight abutting engagement with one another before the air cylinder is deactuated and the tool is removed.

20 Claims, 4 Drawing Sheets

FIG. 1.
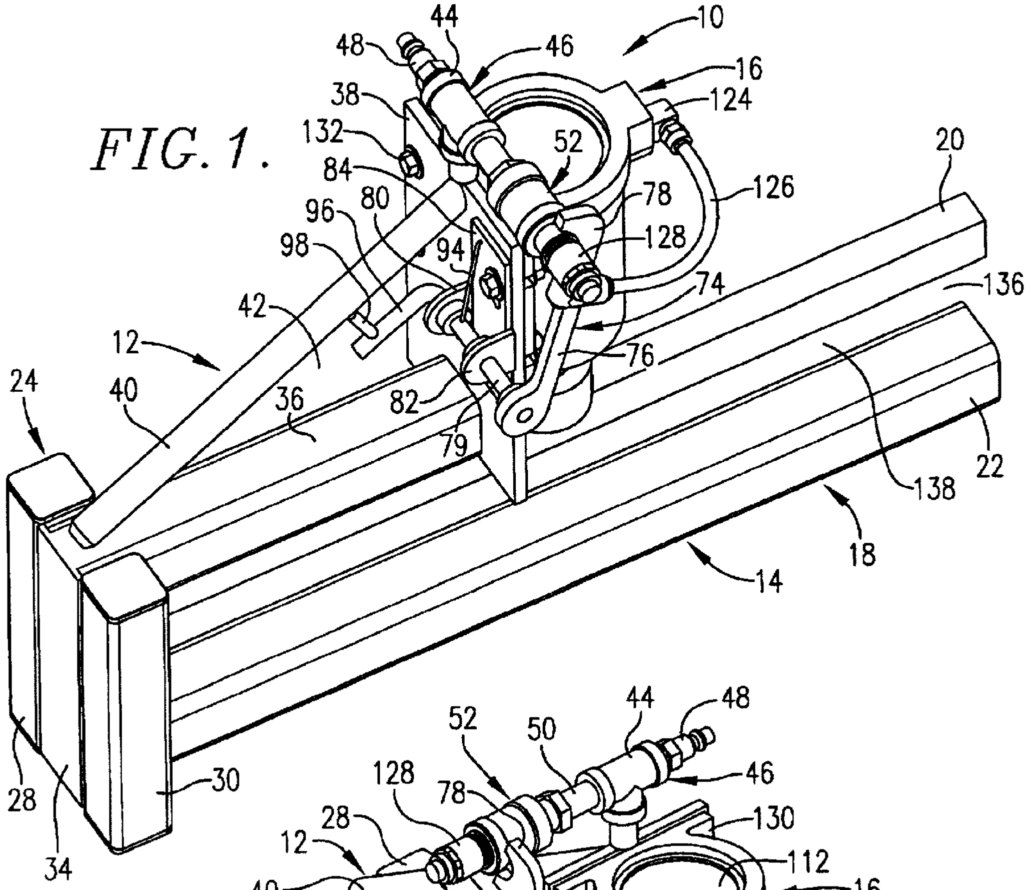
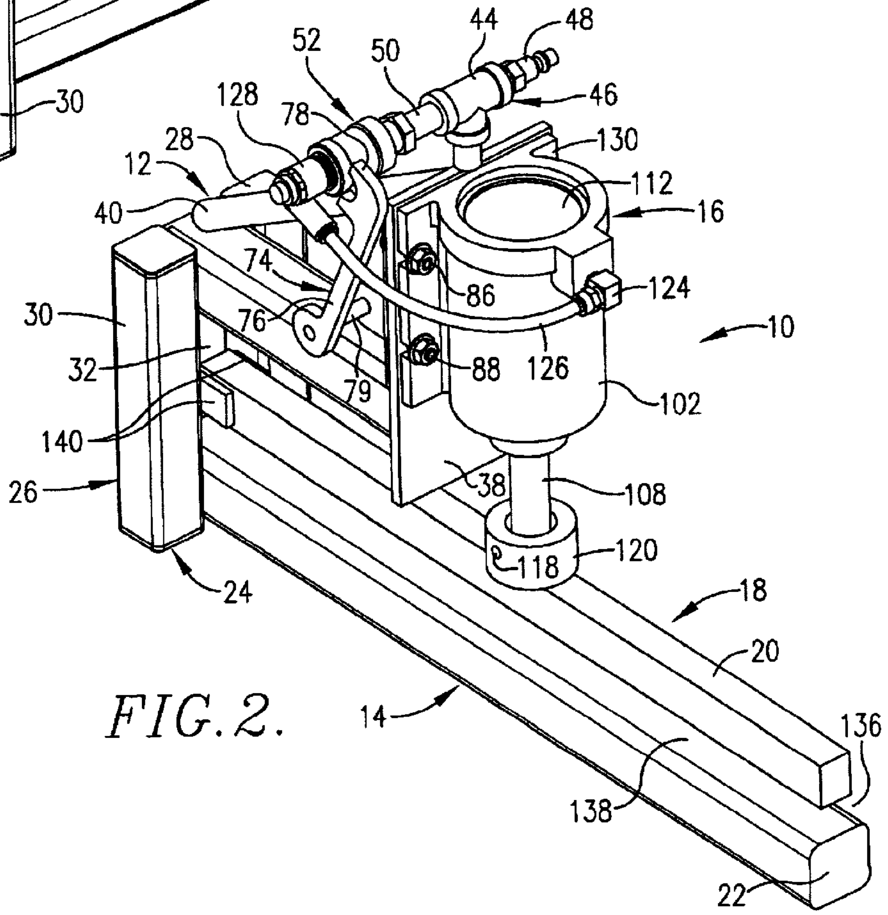
FIG. 2.

WOOD PANEL CLAMPING TOOL

TECHNICAL FIELD

The present invention relates to the cabinet-making art and, more particularly, to a power-operated hand tool that can be used by the cabinetmaker or other craftsman to clamp a plurality of side-by-side boards into generally flat alignment with one another to form a wooden panel for use as a cabinet door or the like.

BACKGROUND

Wood panels used as cabinet doors and the like are typically constructed from a number of boards that are glued together edge-to-edge to form the complete panel. The panel may then be sanded or planed flat and milled out or routered to produce an aesthetically pleasing design on the front face of the panel.

Small cabinet-making shops typically lack a good way of forcing the boards into flat alignment with one another and holding them in such alignment while the panel is being squeezed from the sides by pipe clamps or the like until adhesive between edges of the boards sets up. Typically, cabinetmakers may have to use mallets to pound the boards into place while they adjust and readjust the pipe clamps at various locations along the length of the boards. It can be a slow, tedious, inexact, and sometimes frustrating procedure.

SUMMARY OF THE INVENTION

The present invention overcomes the problems of the prior art by providing a power-operated hand tool that the cabinetmaker or other craftsman can use to quickly and easily clamp the individual boards of the panel vertically into generally flat, horizontal alignment with one another during the panel-making process. With the boards clamped flat by the flattening tool, the craftsman can then use a pipe clamp adjacent the tool to squeeze the boards together horizontally so their edges are in tight, abutting engagement with one another. With the clamp tightened, the craftsman releases the flattening tool, withdraws it from the boards, and reinstalls it at a different location along their length if necessary. After the panel has been completely flattened and the boards are tightly held by the clamps, the flattening tool is removed and adhesive that has been applied to edges of the boards is allowed to cure.

In a preferred embodiment, the tool is designed for two-handed operation, having a handle portion that is gripped by both hands of the user so as to both stabilize the tool and keep both hands in a safe location during operation. One gripping element of the handle portion extends generally in a vertical plane and is disposed to be gripped by one hand of the operator. A second gripping element extends in a generally horizontal plane transverse to the first gripping element and is offset vertically therefrom in disposition to be gripped by the other hand of the user. A safety lock associated with the first gripping element is disposed within reach of the user's index finger when he grasps the first gripping element so as to release the lock and permit actuation of a valve in the vicinity of the second gripping element. The valve is so disposed that when the user's other hand is engaged with the second gripping element, the index finger and thumb can shift the valve to its opened position, allowing pressurized air to actuate an air cylinder associated with the clamping portion of the tool.

The clamping portion of the tool includes a pair of opposed jaws that are shifted relative to one another by the air cylinder. In a preferred embodiment, the lower jaw is fixed, while the upper jaw is moveable, being supported by the piston rod of the air cylinder for movement toward and away from the fixed jaw. Preferably, the two jaws are in the nature of elongated, parallel bars that are relatively narrow and which are adapted to extend transversely across the boards, with the lower jaw beneath the boards and the upper jaw above the boards, during use. To facilitate reception of the boards into the space between the two clamping bars, both bars have outboard, free ends that define an open entry mouth into the clamping zone. The tool is thus applied to the boards endwise as the open mouth receives the boards, and is similarly withdrawn endwise from the boards as they pass outwardly through the open mouth at the conclusion of the flattening procedure.

To facilitate use of the tool, in a preferred embodiment of the invention the boards are supported a short distance above a work surface by pipe clamps or other types of clamp devices. By supporting the boards in this way, a clearance space is defined beneath the boards that provides room for the lower jaw of the tool to slip into position beneath the boards when the tool is initially applied. Similarly, the lower jaw can be easily withdrawn from beneath the boards following actuation and release of the flattening jaws.

BRIEF DESCRIPTION OF THE DRAWINGS

FIG. 1 is a top rear perspective view of a flattening tool embodying the principles of the present invention with the jaws of the tool illustrated in an open, standby condition;

FIG. 2 is a top front perspective view of the tool with the jaws actuated;

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 3:
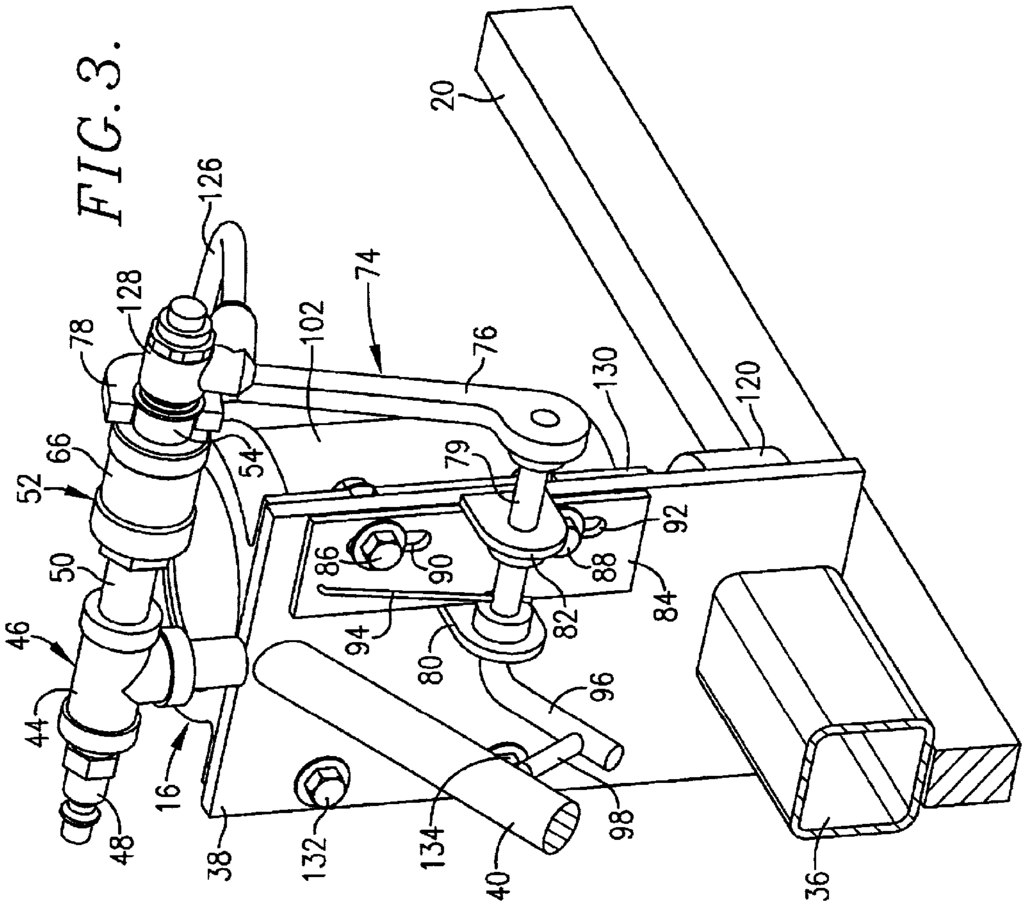
FIG. 3 is an enlarged, fragmentary rear perspective view of the tool with parts removed to illustrate details of construction.

With initial reference to FIGS. 1–3, the flattening tool 10 broadly includes a handle portion 12, a clamping portion 14, and a power device 16 operably coupled with a clamp 18 of clamping portion 14 for causing relative movement of a pair of superimposed jaws 20 and 22 of clamp 18. In the preferred embodiment, lower jaw 22 is fixed, while upper jaw is moveable toward and away from lower jaw 22 in response to actuation and deactuation of device 16.

Handle portion 12 includes a frame 24 comprising an upright portion 26 that is presented by a pair of vertical, horizontally spaced apart members 28 and 30 of generally rectangular cross-sectional configuration. As shown best in FIG. 2, the space between the two members 28,30 defines a vertical guide slot 32 that receives the inboard end of upper jaw 20 to guide jaw 20 during vertical actuation thereof by power device 16. As illustrated in FIG. 1, an upright plate 34 extends between vertical members 28,30 in a flush condition with the rear faces thereof to serve as a wall closing off the rear extremity of slot 32.

Frame 24 further includes a horizontal arm 36 that is fixed to the upper end of upright frame portion 26 and projects laterally outwardly therefrom. Arm 36 is preferably of rectangular tubular configuration as illustrated in FIG. 3 and is sized to fit between vertical members 28,30 into abutting engagement with plate 34 for fixed connection such as by welding to the upper ends of members 28 and 30.

Frame 24 also includes an upright support plate 38 of rectangular configuration that is fixed to the outboard end of arm 36 and projects upwardly therefrom. In addition, frame 24 includes a diagonal brace 40 of circular rod stock that is fixed at its opposite ends to the upper end of plate 38 and the inboard end of arm 36 so as to rigidify plate 38.

As will become apparent, brace 40 serves the additional function of forming a gripping element that may be grasped by one hand of the user during operation. It will be noted in this respect that brace 40 extends generally in a vertical plane that also includes arm 36 and that a gap 42 is defined between brace 40 and arm 36. Gap 42 provides room for the fingers of one hand to wrap around brace 40 when it is grasped by one hand of the user (see also FIG. 8). Thus, brace 40 serves as one part of what may be broadly referred to as handle structure for the tool 10.

Figure 8:
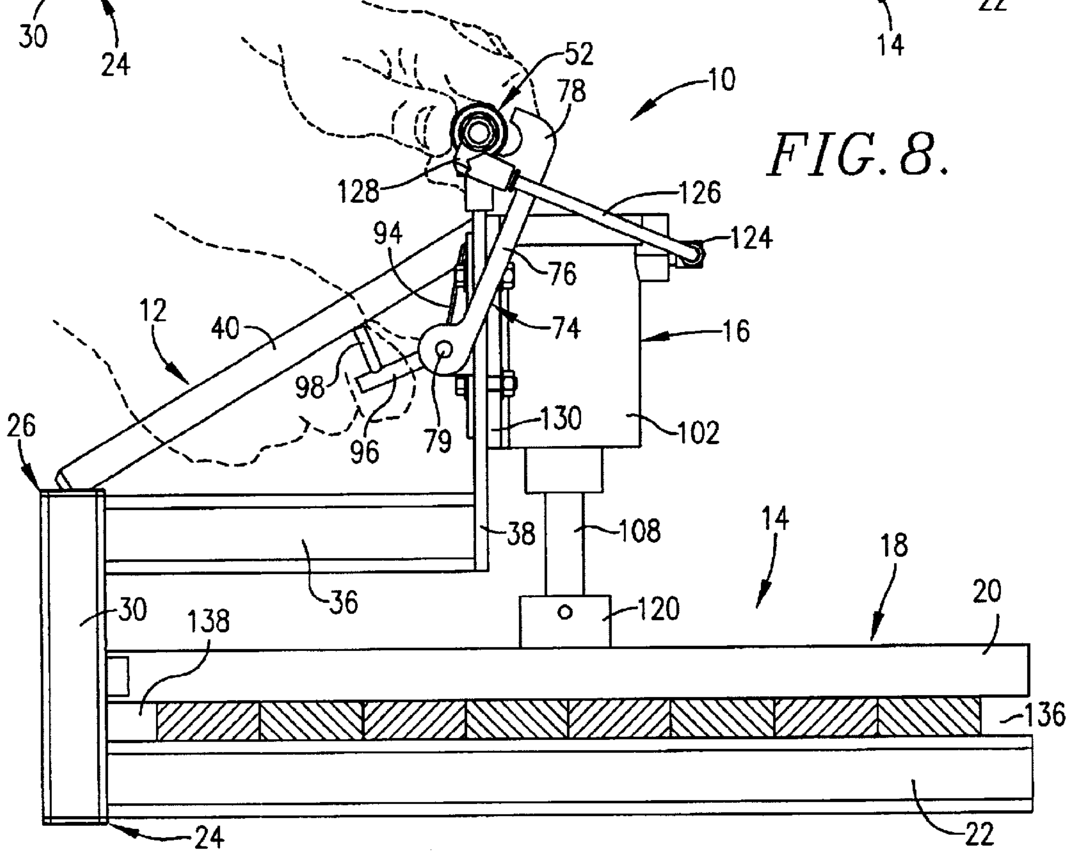
FIG. 8 is a side elevational view of the tool similar to FIG. 7 but illustrating the flattening jaws clamped down against the boards.

A second part of the handle structure is located on top of support plate 38. This part comprises a rigid horizontal gripping element 44 extending transversely of brace 40 within a horizontal plane. Transverse gripping element 44 is vertically offset from brace 40 and is disposed symmetrically with respect to the longitudinal axis of brace 40. In one preferred embodiment, gripping element 44 is tubular and comprises the upper transverse portion of a generally T-shaped member 46 fixed to and projecting upwardly from the upper end of support plate 38. As will be seen, the tubular gripping element 44 also functions as a portion of the air line for supplying power device 16 with pressurized air. As illustrated in FIG. 8, gripping element 44 is disposed and configured for gripping by the other hand of the user during operation to permit secure holding of the tool 10 and to facilitate actuation of the power device 16, as will be seen.

Secured to gripping element 44 and extending outwardly from one end thereof is a fitting 48 that is adapted to be connected at its outermost end with a flexible air hose or the like (not shown) leading to a source of pressurized air, such as a readily commercially available air compressor. Fitting 48 communicates with the interior of gripping element 44, which has a relatively short tube 50 projecting outwardly from its opposite end. An off/on control valve broadly denoted by the numeral 52 (detailed in FIG. 4) is secured to the downstream end of tube 50 for permitting or denying the flow of pressurized air to power device 16. Any one of a number of different types of valves may be employed as the off/on valve 52. In one preferred embodiment, the valve 52 may comprise a slide safety valve obtainable from MSC Industrial Supply Co. Inc. of Palatine, Ill. as Part No. 00082080.

As shown in FIG. 48, valve 52 may include a central valve body 54 having an upstream chamber 56 communicating with tube 50, and a downstream chamber 58 communicating with an outlet tube 60. Upstream chamber 56 has a plurality of radially extending passages 62 that lead to the exterior of body 54 while, correspondingly, downstream chamber 58 has a plurality of radial passages 64 that also lead to the exterior of valve body 54. A slide collar 66 encircles valve body 54 and has an internal, annular recess 68. When slide collar 66 is in the unactuated position of FIG. 4, recess 68 covers only passages 62 associated with upstream chamber 56, thus precluding communication between chambers 56 and 58. However, when slide collar 66 is shifted sufficiently leftwardly from its FIG. 4 position to an actuated position in which recess 68 overlies both passages 62 of upstream chamber 56 and passages 64 of downstream chamber 58, communication is established between chambers 56 and 58 so as to permit pressurized air to flow through valve 52.

Advantageously, slide collar 66 is disposed for actuation by the thumb and index finger of one hand of the user as illustrated in FIG. 8 when that hand is gripping the gripping element 44. A split ring 70 encircling the downstream end of valve body 54 serves as a stop for limiting sliding motion of the collar 66 in the valve actuating direction while, at the other extreme, a shoulder 72 at the upstream end of valve body 54 limits motion of the slide collar 66 to a point no further than its unactuated or closed position of FIG. 4.

Figures 4, 6:
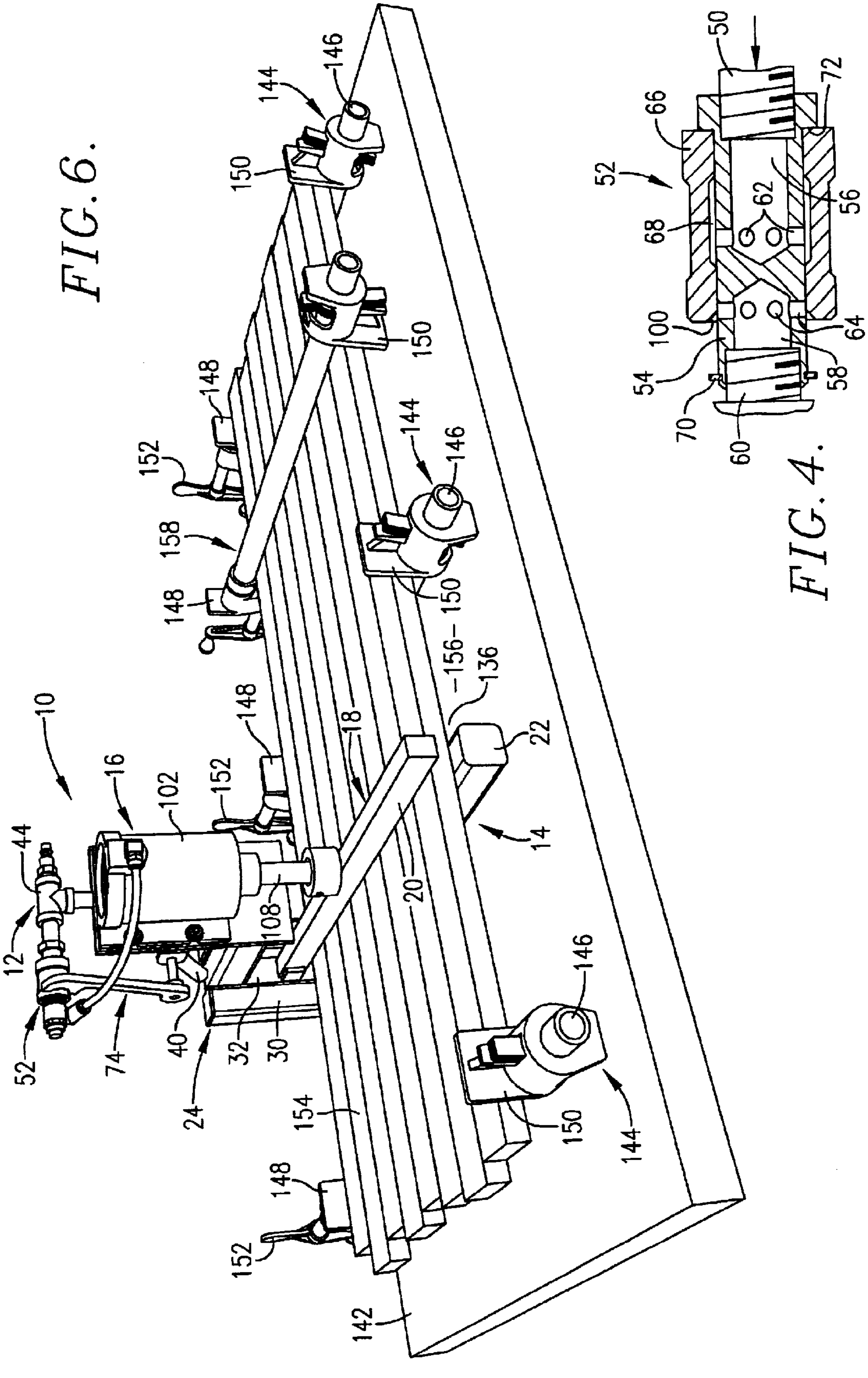
FIG. 4 is an enlarged, fragmentary cross-sectional view through the air line and valve for the air cylinder.
FIG. 6 is a front perspective view of a typical panel-making set up in accordance with the principles of the present invention.

The tool 10 is provided with a safety lock broadly denoted by the numeral 74 for releaseably retaining slide collar 66 in its unactuated position of FIG. 4. It will be noted that when slide collar 66 is in its unactuated position, a significant portion of the downstream, cylindrical end of valve body 54 is exposed. This exposed downstream portion of valve body 54, just inboard of split ring 70, may advantageously be used by the safety lock 74 to releaseably block actuating movement of slide collar 66. Thus, as illustrated in FIGS. 1, 2 and 3, for example, safety lock 74 may comprise, in part, a swingable lever 76 having a fork 78 at its upper end. Fork 78 is sized to partially embrace the exposed end of valve body 54 when slide collar 66 is in its unactuated position, thus blocking axial movement of collar 66 to its actuating position. When lever 76 is rocked away from valve body 54 to a released position as illustrated in FIGS. 2 and 8, however, fork 78 moves out of the way of slide collar 66 and permits the same to be actuated.

Figure 7:
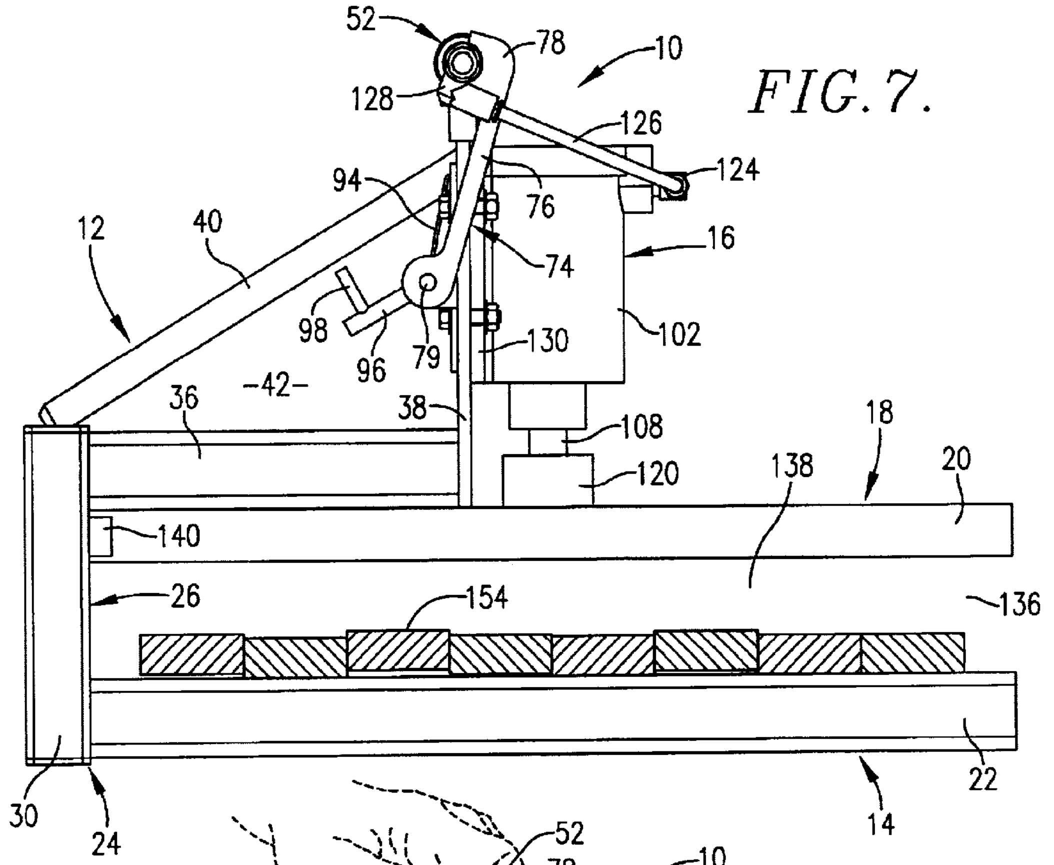
FIG. 7 is a side elevational view of the tool applied to the boards preparatory to flattening thereof.

In order to accomplish such movement of locking lever 76, the inboard end thereof is fixed to a transverse, horizontally extending shaft 79 that is journalled for rotation by a pair of outwardly projecting mounting ears 80 and 82 on a plate 84 that is fastened to upright support plate 38 by bolts 86 and 88. Bolts 86 and 88 pass through vertically elongated slots 90 and 92 in plate 84 to permit vertical adjustment of safety lock 74. A relatively stiff spring wire 94 is connected at one end to plate 84 and passes through shaft 79 at its opposite end to yieldably bias shaft 79 in a direction tending to keep fork 78 of lever 76 embracing valve body 54 in the locked condition. An outturned leg 96 of shaft 79 serves as a trigger which may be engaged by the user's index finger when grasping brace 40 to release safety lock 74 against the resistance of spring 94. A projection 98 extending diagonally upwardly from the leg 96 generally adjacent its outermost end is disposed for abutting engagement with the underside of brace 40 after shaft 79 has been rotated sufficiently far as to disengage fork 78 from valve body 54. The two extreme positions of lock lever 76 are illustrated in FIGS. 7 and 8.

Power device 16 is in the nature of an air cylinder that extends when supplied with pressurized air and retracts when the pressurized air flow is discontinued. As seen in FIG. 4, slide collar 66 has a bevel 100 at its downstream end that communicates passages 64 with the atmosphere when slide collar 66 is in its closed position, thus allowing the air cylinder to be exhausted at that time.

Figure 5:
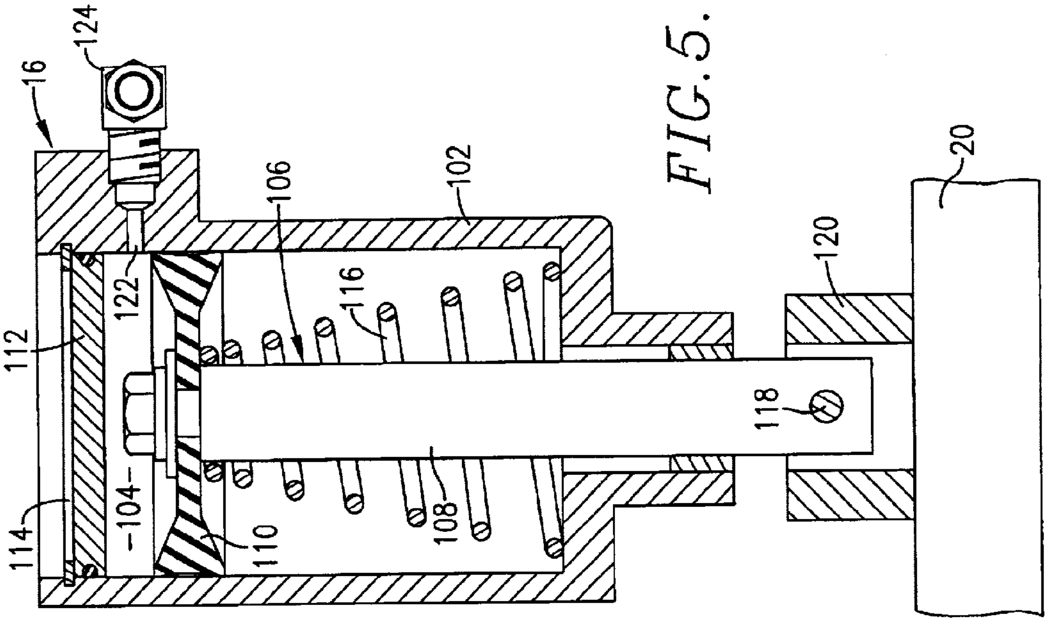
FIG. 5 is an enlarged vertical cross-sectional view through the air cylinder of the tool illustrating details of construction.

The air cylinder 16 (detailed in FIG. 5) includes a generally cylindrical housing 102 having an internal air chamber 104 located above a reciprocable piston 106 that includes a central rod 108 and a transverse, upper head 110 that makes sealing engagement with the internal surface of housing 102. A circular top plate 112 closes off chamber 104 and is retained in place by a split ring 114 removeably fixed to the interior wall of housing 102 in overlying relationship to top plate 112. A conical compression spring 116 encircles rod 108 below head 110 and is trapped between the latter and the bottom internal wall of chamber 102 so as to yieldably bias piston 106 toward the retracted position illustrated in FIG. 5. The lower end of rod 108 passes through the bottom wall of housing 102 and is connected via a transverse pivot 118 to a mounting collar 120 that is in turn fixed to upper jaw 20. An exhaust port (not shown) in the bottom wall of housing 102 allows air below piston head 110 to be exhausted from the housing during extension of the piston 106.

Adjacent the upper end of housing 102, a port 122 passes through the sidewall of the housing in communication with chamber 104. A fitting 124 communicates with port 122 and connects to a hose 126 leading to a flow regulator 128 coupled in flow communication with outlet tube 60 from valve body 54. Flow regulator 128 is operable to adjustably constrict or enlarge the flow path of pressurized air from valve body 54 into hose 126 so as to control the volume of air admitted into air cylinder 16 per unit of time when control valve 52 is open, thus controlling the speed at which piston 106 is actuated during the extension stroke thereof. The flow regulator 128 is commercially available from a variety of sources well known to those skilled in the art; one such acceptable valve is a flow control or metering valve available from MSC Industrial Supply Co. Inc. of Palatine, Ill. is as Part No. 50083462.

Housing 102 has a rectangular mounting plate 130 integrally formed therewith. Mounting plate 130 lies up against the outside face of support plate 38 and is releaseably affixed thereto by bolts 86 and 88, as well as by a pair of additional bolts 132 and 134. Thus, air cylinder 26 is supported at the outer end of frame arm 36 and is disposed such that the piston rod 108 reciprocates up and down across the outer end of arm 36.

The jaws 20 and 22 of clamp 18 have free outermost ends that are disconnected from one another so as to define a mouth 136 therebetween that opens into a clamping zone 138 between jaws 20 and 22. Clamping zone 138 runs the full length of jaws 20 and 22, from upright frame portion 26 at the inboard end to mouth 136 at the outboard end. In the preferred embodiment, each jaw 20,22 is in the form of an elongated bar of rectangular cross section, the jaw 20 comprising a solid bar while the fixed jaw 22 comprises a square tube that is closed at its outer end. The inboard end of upper jaw 20 is received within guide slot 32 and is provided with a pair of spacer pads 140 on opposite sides thereof to reduce wobble of the upper jaw 10 relative to upright frame portion 26 during reciprocation of upper jaw 20. Preferably, the bottom surface of upper jaw 20 is slightly bowed or arched longitudinally from the inboard end to the outboard end thereof so that the bottom surface is not perfectly flat. The slight concavity causes the center portion of bar 20 directly beneath piston rod 108 to be recessed slightly with respect to the opposite inboard and outboard ends of jaw 20, but preferably no more than about 0.015 inches.

Operation

FIG. 6 illustrates a typical set up for using tool 10 and carrying out my novel method. In the illustrated embodiment, a flat work surface 142, such as a bench top or the like, is provided on which the operational steps can be carried out. A plurality of clamps 144, such as bar clamps or pipe clamps, are first placed on the work surface 142 at spaced intervals with their long pipes 146 or bars supported a short distance above the work surface 142 by the opposite clamp parts 148 and 150, which engage and rest upon surface 142. Clamp part 150 is essentially stationary after adjustment along the length of the pipe 146, and clamp part 148 is adjustable toward and away from part 150 using a crank handle 152 as well understood by those skilled in the art. A group of individual boards 154 to be formed into a panel are laid out on top of and across pipes 146 of clamps 144 so that a clearance space 156 is defined beneath boards 154, between the latter and work surface 142.

Although in FIG. 6 boards 154 are illustrated as being laid down in edge-to-edge relationship, before being disposed in that position they may first be placed on edge so that one of such edges is turned up to permit the cabinetmaker to apply an adhesive along the surface of that edge. If desired, the boards may then be rotated 180 degrees so as to expose the opposite edge, to which an adhesive may be applied as well. Thereafter, the boards are laid down into edge-to-edge relationship as illustrated in FIG. 6. At this time, clamps 144 may be operated in such a manner as to lightly squeeze the edges of the boards into abutting relationship with one another. One or more additional upper clamps 158, having the same construction as the clamps 144, may be applied along the top surfaces of boards 154, only one of such top clamps 158 being illustrated in FIG. 6.

With the boards 154 thusly supported by clamps 144 above work surface 142 to provide a clearance space 156, flattening tool 10 may be gripped by both hands in the manner illustrated in FIG. 8 and applied to boards 154 with the lower jaw 22 slipping underneath boards 154 through clearance space 156 while the upper jaw 20 becomes placed across the upper surface of boards 154. During this application of tool 10 to the boards 154, boards 154 enter into the clamping zone 138 via the open mouth 136 of clamp 18. It will be appreciated that during such initial application of tool 10 to the boards 154, jaw 20 is fully raised as illustrated in FIG. 7, inasmuch as piston 106 of air cylinder 16 is retracted. It will also be appreciated that, as illustrated in FIG. 7, boards 154, while being disposed generally in the same horizontal plane with respect to one another, are not flattened into the same plane so as to present a relatively smooth upper surface. Instead, due to warpage or otherwise, some of the boards 154 project up higher than others to present an irregular and uneven top surface.

Once boards 154 have been received within clamping zone 138 with jaws 20,22 extending transversely across the boards, the operator may squeeze trigger leg 96 as shown in the FIG. 8. This unlocks valve 52 and allows slide collar 66 to be shifted with the user's other hand to its open position, whereupon pressurized air is admitted into air cylinder 16 to move upper jaw 20 down into clamping engagement with boards 154. As upper jaw 20 presses boards 154 down into flat alignment, the upper surface of the panel thus created becomes relatively smooth and flat without significant irregularities. With the boards thusly flattened, at least in the region to which clamping jaws 20,22 have been applied, the appropriate clamp 144 adjacent to the jaws 20,22 may then be further tightened so as to squeeze boards 154 into even tighter abutting engagement with one another. Once the appropriate clamp 144 has been so adjusted, slide valve 52 may be reopened to raise clamping jaw 20, whereupon tool 10 may be withdrawn from boards 154 as they leave zone 138 via the open mouth 136.

If necessary or desired, the tool 10 may then be reapplied to the boards 154 in the same manner as previously described at a new location along the length of the boards. For example, while FIG. 6 shows tool 10 applied to boards 154 between a pair of lower clamps 144, after the first flattening operation the tool 10 may be removed and reapplied to boards 154 between the next pair of lower clamps 144, such as adjacent upper clamp 158. The above described procedure is repeated at that new location, including the tightening down of clamps 144 and 158 following flattening of the boards by tool 10 so that the glued edges are squeezed together in tight abutting engagement. Thereupon, tool 10 may be removed completely from boards 154 and the composite panel thus formed by boards 154 may be removed from work surface 142 and placed in another location until the adhesive has dried. In the meantime, additional panels may be glued and flattened on work surface 142.

It will be appreciated from the foregoing that by using my novel tool 10, solid wood panels may be glued together in a flat condition quickly and easily without the frustrations, delays and other problems associated with prior art flattening techniques. By having boards of each panel flatter to begin with, the panel will require fewer trips through a planer and less sanding than would otherwise be the case. Since less material is removed to flatten the top surface of the panel, more material is left for the panel itself. This means less wear and tear on equipment such as sanders, belts, blades and other components, as well as less effort and time expended by the cabinetmaker. Moreover, it should allow the cabinetmaker to start with thinner lumber in the first place, leading to significant cost savings in that respect.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

What is claimed is:

1. A hand tool for use in flattening side-by-side boards of a wood panel comprising:

a frame;

a clamp on said frame including a pair of elongated, generally parallel, vertically spaced and mutually opposed jaws cooperating to define a clamping zone therebetween, each of said jaws having an outermost free end cooperating with the corresponding free end of the other jaw to define an open mouth;

handle structure associated with the frame for permitting the user to install the tool onto a set of side-by-side boards through said open mouth with the jaws transverse to and on opposite upper and lower sides of the boards; and an actuatable power device on said frame operably coupled with the clamp for causing boards within the clamping zone to be squeezed between the jaws into generally flat alignment with one another when the power device is actuated, one of said jaws comprising a fixed jaw, the remaining jaw comprising a movable jaw that is movable toward and away from the fixed jaw in response to actuation of the power device, said frame including a guide for said movable jaw, said frame including an upright portion, said guide comprising a guide slot in said upright portion, said movable jaw having an inboard end disposed within said slot.

2. A hand tool as claimed in claim 1, said upright portion comprising a pair of horizontally spaced apart upright members, said members defining said guide slot therebetween.

3. A hand tool as claimed in claim 1, said power device comprising an air cylinder.

4. A hand tool for use in flattening side-by-side boards of a wood panel comprising:

a frame a clamp on said frame including a pair of elongated, generally parallel, vertically spaced and mutually opposed jaws cooperating to define a clamping zone therebetween, each of said jaws having an outermost free end cooperating with the corresponding free end of the other jaw to define an open mouth;

handle structure associated with the frame for permitting the user to install the tool onto a set of side-by-side boards through said open mouth with the jaws transverse to and on opposite upper and lower sides of the boards; and an actuatable power device on said frame operably coupled with the clamp for causing boards within the clamping zone to be squeezed between the jaws into generally flat alignment with one another when the power device is actuated, said frame including an upright portion having an upper end and a lower end, one of said jaws comprising a fixed jaw at the lower end of said upright portion and projecting laterally outwardly therefrom, said frame further including an arm fixed to the upper end of the upright portion and projecting laterally outwardly therefrom above the fixed jaw, said arm being shorter than said fixed jaw, said power device being secured to the outer end of said arm and supporting the remaining jaw of the clamp in disposition below the arm and in vertical registration with the fixed jaw for movement toward and away from the fixed jaw during actuation of the power device.

5. A hand tool as claimed in claim 4, said frame further including an upright support fixed to the outer end of said arm and projecting upwardly therefrom, said power device being mounted on said support.

6. A hand tool as claimed in claim 5, said frame further including a brace between the arm and the support, said brace being configured to present at least a portion of said handle structure.

7. A hand tool as claimed in claim 6, said brace extending in a generally vertical plane to permit gripping by one hand of the user, said handle structure further including a gripping element extending transversely of said brace in a generally horizontal plane to permit gripping by the other hand of the user.

8. A hand tool as claimed in claim 7, said gripping element being offset vertically from said brace.

9. A hand tool as claimed in claim 8, said gripping element being secured to the upper end of said upright support.

10. A hand tool as claimed in claim 7, said power device comprising an air cylinder, said gripping element being tubular and comprising part of an air conduit for supplying pressurized air to said cylinder.

11. A hand tool for use in flattening side-by-side boards of a wood panel comprising:

a frame;

a clamp on said frame including a pair of elongated, generally parallel, vertically spaced and mutually opposed jaws cooperating to define a clamping zone therebetween, each of said jaws having an outermost free end cooperating with the corresponding free end of the other jaw to define an open mouth;

handle structure associated with the frame for permitting the user to install the tool onto a set of side-by-side boards through said open mouth with the jaws transverse to and on opposite upper and lower sides of the boards; and an actuatable power device on said frame operably coupled with the clamp for causing boards within the clamping zone to be squeezed between the jaws into generally flat alignment with one another when the power device is actuated, said power device comprising an air cylinder, said air cylinder having a manually actuatable valve associated therewith that is operable when actuated to admit pressurized air into the cylinder, said handle structure having a releasable safety lock operable when locked to prevent actuation of the valve and operable when released to permit actuation of the valve, said safety lock being disposed to permit manual release thereof when the handle structure is grasped by the user.

12. A hand tool as claimed in claim 11, said handle structure including a first gripping element extending in a vertical plane for gripping by one hand of the user, said handle structure further including a second gripping element extending transversely of said first element in a generally horizontal plane for gripping by the other hand of the user.

13. A hand tool as claimed in claim 12, said second gripping element being offset vertically from said first gripping element.

14. A portable hand tool for use in flattening side-by-side boards of a wood panel comprising:

a hold-down clamp including a pair of elongated, generally parallel, vertically spaced and mutually opposed jaws cooperating to define a clamping zone therebetween, each of said jaws having an outermost free end cooperating with the corresponding free end of the other jaw to define an open mouth leading into said clamping zone; and an actuatable power device operably coupled with the clamp for operating the same, said clamp and said power device being mounted on a common portable frame for movement of the frame, clamp and power device together as a unit when the tool is applied to a panel, said jaws being disposed to extend across the side-by-side boards of a panel above and below the same when the panel is inserted into the clamping zone through said open mouth and the power device is actuated.

15. A hand tool as claimed in claim 14, one of said jaws comprising a fixed jaw and the other of said jaws comprising a movable jaw, said frame including an upright portion having an upper end and a lower end, said fixed jaw being disposed at the lower end of said upright portion and projecting laterally outwardly therefrom, said frame further including an arm fixed to the upper end of the upright portion and projecting laterally outwardly therefrom above the fixed jaw, said power device being secured to said arm and supporting the movable jaw in disposition below the arm and in vertical registration with the fixed jaw for movement toward and away from the fixed jaw during actuation of the power device.

16. A hand tool as claimed in claim 15, said upright portion of said frame including a guide for an inner end of said movable jaw when the movable jaw is moved toward and away from the fixed jaw.

17. A hand tool as claimed in claim 14, said frame including a portion configured to present handle structure for gripping by a user of the tool.

18. A hand tool as claimed in claim 17, said handle structure including a first gripping element extending in a vertical plane for gripping by one hand of the user, said handle structure further including a second gripping element extending transversely of said first element in a generally horizontal plane for gripping by the other hand of the user.

19. A hand tool as claimed in claim 18, said second gripping element being offset vertically from said first gripping element.

20. A hand tool as claimed in claim 19, said power device comprising an air cylinder, said second gripping element being tubular and comprising part of an air conduit for supplying pressurized air to said cylinder.

* * * * *